No. 724,324. PATENTED MAR. 31, 1903.
E. T. PARSONS.
HOSE COUPLING.
APPLICATION FILED MAR. 11, 1902.
NO MODEL.
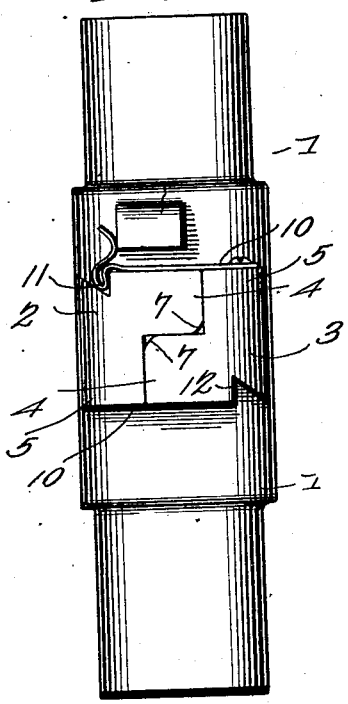
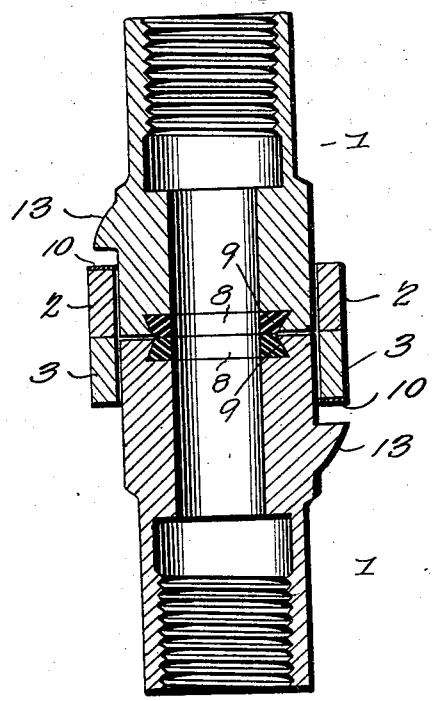
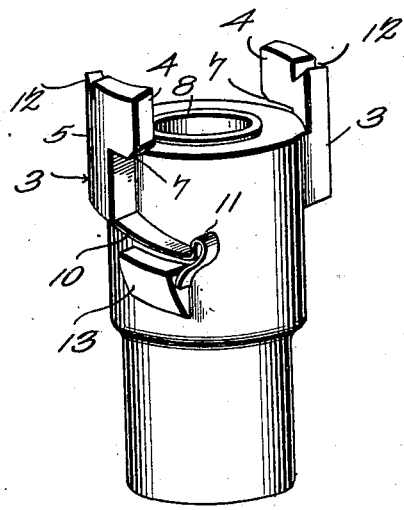

UNITED STATES PATENT OFFICE.

EDWARD TILDEN PARSONS, OF LOUISVILLE, KENTUCKY.

HOSE-COUPLING.

SPECIFICATION forming part of Letters Patent No. 724,324, dated March 31, 1903.

Application filed March 11, 1902. Serial No. 97,765. (No model.)

*To all whom it may concern:*

Be it known that I, EDWARD TILDEN PARSONS, a citizen of the United States, residing at Louisville, in the county of Jefferson and State of Kentucky, have invented a new and useful Hose-Coupling, of which the following is a specification.

The invention relates to improvements in hose-couplings.

The object of the present invention is to improve the construction of hose-couplings and to provide a simple and comparatively inexpensive one adapted to be employed for coupling sections of hose and other pipes and capable of enabling either end of any length or piece of hose to be readily connected to either end of any other length or piece.

The invention consists in the construction and novel combination and arrangement of parts hereinafter fully described, illustrated in the accompanying drawings, and pointed out in the claims hereto appended.

In the drawings, Figure 1 is an elevation of a hose or pipe coupling constructed in accordance with this invention. Fig. 2 is a longitudinal sectional view of the same. Fig. 3 is a detail perspective view of one of the sections or members of the coupling.

Like numerals of reference designate corresponding parts in all the figures of the drawings.

1 1 designate similar members or sections adapted to interlock, as illustrated in Figs. 1 and 2 of the accompanying drawings, for connecting pieces or lengths of hose or other pipes, and each section or member is provided at opposite sides with approximately L-shaped enlargements 2 and 3, forming offset transversely-disposed arms 4, extending outward from the longitudinal or shank portions 5 of the enlargements and having inner transverse engaging edges, which are adapted to interlock with the corresponding edges of the transverse arms of the adjacent section or member. The end portions of the engaging faces are slightly beveled at 7 to facilitate the engagement of the arms and to enable the washers 8 to be readily compressed in coupling pieces of hose or pipe. The transverse arms 4 have their engaging inner edges located slightly beyond the outer ends of the sections or members 1 to allow for the projecting portions of the washers, and the said engaging faces are arranged substantially in the same planes as the ends of the sections or members, so that the latter will be drawn in close contact to reduce to a minimum the projecting portions of the washers. The elastic washers, which are preferably constructed of rubber, but which may be made of any suitable material, are arranged in dovetailed seats or grooves 9, consisting of annular grooves formed in the outer ends of the sections or members and having undercut outer walls, as clearly shown in Fig. 2 of the accompanying drawings, and the elastic washers are tapered to correspond to the dovetailed seats and to interlock with the sections or members. The transverse arms of the L-shaped enlargements are locked in engagement with each other by spring-catches 10. Each section or member is designed to be provided with a spring-catch, which consists of a resilient shank secured at one end to the longitudinal portion of the L-shaped enlargement and extending transversely of the coupling and provided at its outer end with an engaging portion or head 11, formed by bending the metal of which the spring-catch is constructed. The outwardly-extending engaging portion of the head consists of a loop and is adapted to interlock with a shoulder 12 of the transverse portion of the other section or member, and the free end of the spring is extended to form a handle portion or grip to enable it to be readily disengaged from the shoulder of the enlargement. Each of the lugs or enlargements is provided at its transverse portion with a notch to form a shoulder 12 for engagement with a catch. The sections or members are interlocked by forcing them together and partially rotating them, the catches being adapted to lock the sections or members against such rotary movement, whereby they are held securely in engagement. In order to prevent the catches from being injured when the hose is dragged along the ground, each section or member is provided adjacent to the engaging portion of the catch with a beveled lug 13, forming a guard or shield and adapted to permit the hose to be readily dragged along without catching in any obstruction, owing to its beveled outer face.

The sections may be constructed in any suitable manner for enabling them to be attached to pieces of hose or other pipes, and they may be interiorly threaded and adapted for attachment to a hydrant or cock for enabling a hose to be readily connected to the same.

What I claim is—

1. A device of the class described, comprising two sections or members having interlocking arms, a guard mounted on one of the sections and projecting outward therefrom and spaced from the said arms, and a catch mounted on such sections and interposed between the guard and the arms, whereby the catch is prevented from being injured or released when a hose is dragged along the ground, substantially as described.

2. A device of the class described, comprising two sections or members provided with interlocking arms, a guard projecting outward from one of the sections and spaced from the arms, and a transverse catch interposed between the guard and the arms to prevent it from being injured or released when a hose is dragged over the ground and secured to one arm and engaging the other, substantially as described.

3. A device of the class described, comprising two sections or members provided with interlocking arms, a beveled lug projecting outward from one of the sections and spaced from the said arms, and a catch interposed between the beveled lug and the arms to prevent it from being injured or released when a hose is dragged along the ground and holding the said arms in engagement, substantially as described.

4. A device of the class described, comprising two sections having L-shaped arms interlocked with each other, a beveled lug projecting outward from one of the sections and spaced from the arms and forming guards, and a transverse catch interposed between the lug and the arms to prevent it from being injured or released when a hose is dragged over the ground and secured to one arm and engaging the other, substantially as described.

In testimony that I claim the foregoing as my own I have hereto affixed my signature in the presence of two witnesses.

EDWARD TILDEN PARSONS.

Witnesses:
 LEWIS KEAN CAMERON,
 SAMUEL A. PARSONS.